United States Patent
Barnes

(10) Patent No.: US 10,754,819 B1
(45) Date of Patent: Aug. 25, 2020

(54) METHOD AND SYSTEM FOR IMPLEMENTING AN AUTOMATED ARCHIVING TOOL

(71) Applicant: JPMorgan Chase Bank, N.A., New York, NY (US)

(72) Inventor: James Todd Barnes, Katy, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 565 days.

(21) Appl. No.: 15/587,632

(22) Filed: May 5, 2017

(51) Int. Cl.
*G06F 16/00* (2019.01)
*G06F 16/11* (2019.01)
*G06F 16/958* (2019.01)
*G06F 16/9535* (2019.01)

(52) U.S. Cl.
CPC ........ *G06F 16/113* (2019.01); *G06F 16/9535* (2019.01); *G06F 16/986* (2019.01)

(58) Field of Classification Search
None
See application file for complete search history.

(56) References Cited

U.S. PATENT DOCUMENTS

| 10,162,877 B1* | 12/2018 | Ferguson | G06F 8/41 |
| 2004/0015728 A1* | 1/2004 | Cole | G02B 5/3083 |
| | | | 726/23 |
| 2018/0005286 A1* | 1/2018 | Grabarnik | G06F 16/2477 |

\* cited by examiner

*Primary Examiner* — Grace Park
(74) *Attorney, Agent, or Firm* — Hunton Andrews Kurth LLP

(57) ABSTRACT

An embodiment of the present invention is directed to an automated archiving tool. A system that implements an automated archiving tool comprises: a memory component; an interactive interface that receives one or more user inputs; and a processor, coupled to the memory component and the interactive interface, the processor configured to perform the steps comprising: querying for issues that meet an archive criteria; performing an export of the queried issues that meet the archive criteria; executing a script creating a macro for tickets and associated attachments; archiving the tickets as flat files; executing a script to index the archived issues by project; moving support files to a common directory; macro archiving the attachments; and identifying local references.

20 Claims, 4 Drawing Sheets

METHOD AND SYSTEM FOR IMPLEMENTING AN AUTOMATED ARCHIVING TOOL

FIELD OF THE INVENTION

The present invention generally relates to an archiving tool and more specifically to an automated archiving tool that assesses current issues, identifies and processes potential candidates and efficiently archives the issues.

BACKGROUND OF THE INVENTION

Many entities, including financial institutions, utilize a firm wide defect-tracking platform. With such platforms, a number of historical issues continue to rise causing software platform instability, reduced database access times, and increased maintenance re-index outages. Jira is a proprietary issue tracking product that provides bug tracking, issue tracking and project management functions. Main features of Jira include functionality to plan development iterations, the iteration reports and bug tracking functionality.

Once issues are raised in the system, there is currently no mechanism for their removal besides deletion which introduces problems with historical software deliveries, the trending of systemic issues, and audit traceability.

These and other drawbacks exist.

SUMMARY OF THE INVENTION

Accordingly, one aspect of the invention is to address one or more of the drawbacks set forth above. According to an embodiment of the present invention, an automated computer implemented system that implements an automated archiving tool comprises: a memory component; an interactive interface that receives one or more user inputs; and a processor, coupled to the memory component and the interactive interface, the processor configured to perform the steps comprising: querying for issues that meet an archive criteria; performing an export of the queried issues that meet the archive criteria; executing a script creating a macro for tickets and associated attachments; archiving the tickets as flat files; executing a script to index the archived issues by project; moving support files to a common directory; macro archiving the attachments; and identifying local references.

According to another embodiment of the present invention, an automated computer implemented method that implements an automated archiving tool comprises the steps of: querying for issues that meet an archive criteria; performing an export of the queried issues that meet the archive criteria; executing a script creating a macro for tickets and associated attachments; archiving the tickets as flat files; executing a script to index the archived issues by project; moving support files to a common directory; macro archiving the attachments; and identifying local references.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an automated Archiving Tool that analyzes historical issues, archives the issues to HTML flat files and removes the entries from a database, thereby realizing efficiencies, reducing storage and improving overall system performance. An embodiment of the present invention may be directed to an Archiving Tool specific to a Jira system. In this exemplary application, the requirement for additional Jira instances is decreased because a culling of obsolete defect records are purged from the system. As a result, an embodiment of the present invention provides additional longevity for each production instance.

An Archiving Tool of an embodiment of the present invention extracts and saves the issues. Depending on how an organization is using JIRA, an issue may represent a software bug, a project task, a helpdesk ticket, a leave request form, etc. An issue may be accessed in JIRA from a search result or from a dashboard gadget that provides access to issues.

For example, an Archiving Tool may determine relevant attachments for each issue, save the files, and then create an index of archived records. An Archiving Tool of an embodiment of the present invention may be incorporated into a vendor's software platform to increase ongoing performance, reduce re-index times, and provide a viable archive outside of hosted database data.

Figure 1:
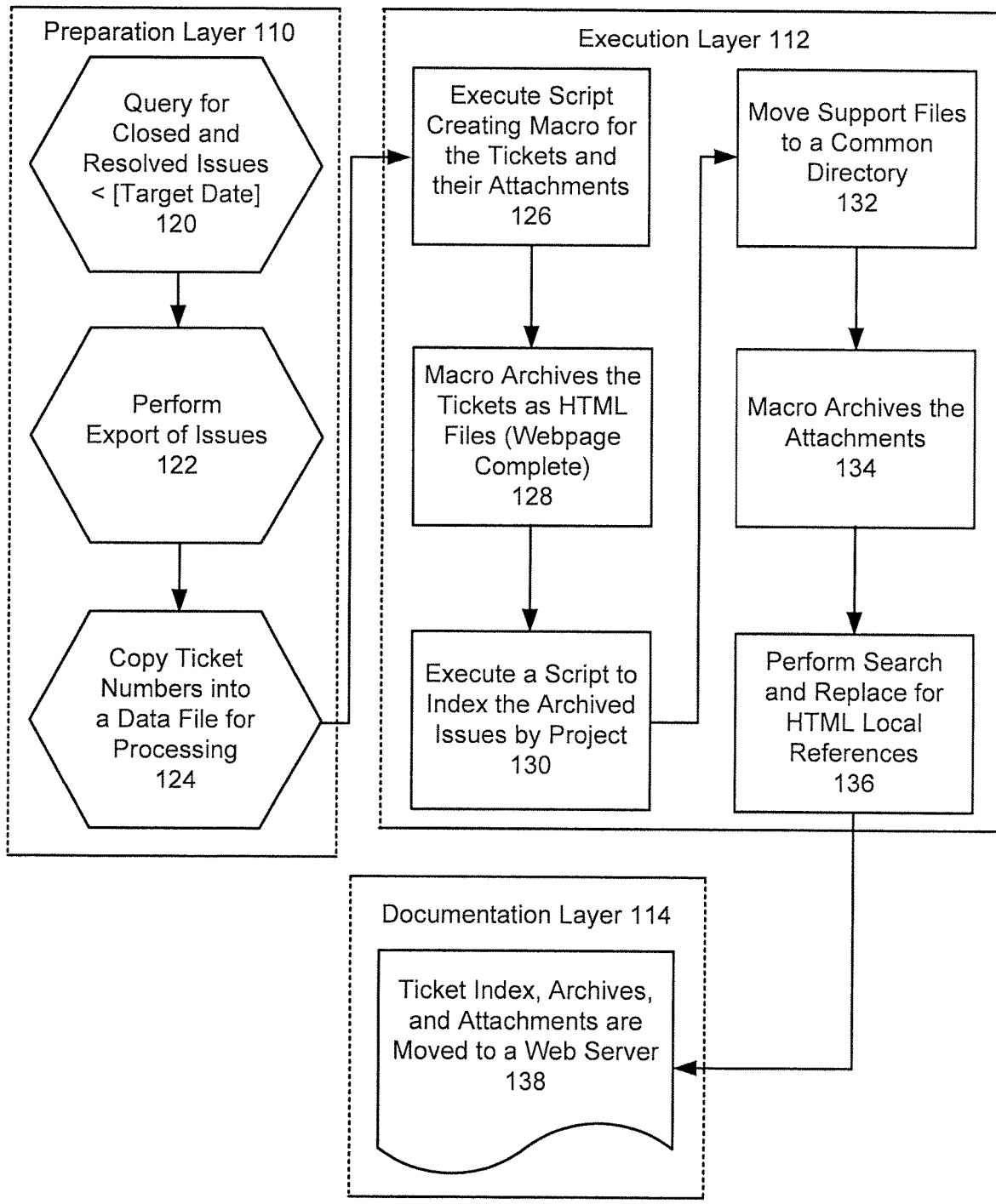
FIG. 1 is an exemplary flowchart of a method for implementing an Automated Archiving Tool, according to an embodiment of the present invention.

FIG. 1 is an exemplary flowchart of a method for implementing an Automated Archiving Tool, according to an embodiment of the present invention. FIG. 1 illustrates an archive application process by separating the steps into a Preparation Layer 110, an Execution Layer 112, and a Documentation Layer 114. At step 120, a system of an embodiment of the present invention may query for closed and resolved issues having a certain date or age, e.g., before a predetermined date. At step 122, the system may perform an export of the queried issues. At step 124, the system may copy corresponding ticket numbers into a data file for processing. At step 126, the system may execute a script creating a macro for the tickets and their attachments. For example, tickets may represent issues. At step 128, a macro may archive the tickets as flat files, such as HTML files. At step 130, the system may execute a script to index the archived issues by project (or other category, filter, etc.). At step 132, the system may move support files to a common directory. At step 134, a macro may archive the attachments. At step 136, the system may perform a search and replace for HTML local references. At step 138, ticket index, archives and attachments may be moved to a web server. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. The steps of FIG. 1 are explained in further detail below.

An embodiment of the present invention is directed to a process to remove tickets, e.g., Jira tickets, without requiring a live Jira instance for archive purposes. According to an embodiment of the present invention, the innovative system and method involves extracting and/or saving tickets, determining attachments for each issue, extracting and/or saving the attachments, indexing archived records, and further deleting the issues.

At step 120, a query may be made for closed and resolved issues relative to a certain date or age. For example, closed and resolved issues with a date before a predetermined date, e.g., Jul. 19, 2010, may be identified. Candidate issues may also be identified based on a date range as well as relating to project, issue, category and/or other factor. According to another example, candidate issues may be identified by person, originator, etc. For example, an embodiment of the present invention may query Jira for closed and resolved issues that meet one or more criteria.

For example, a business rule may keep Closed and Resolved tickets for a time period, such as a 18 month period. The time period may be configurable (e.g., before a dry-run or an actual archive run). This demarcation may preserve existing internal reporting timelines and further serve as a basis for historical reporting for a platform, e.g., a Jira platform. An embodiment of the present invention is directed to an archive candidate selection process that maintains internal links and page consistency.

Figure 2:
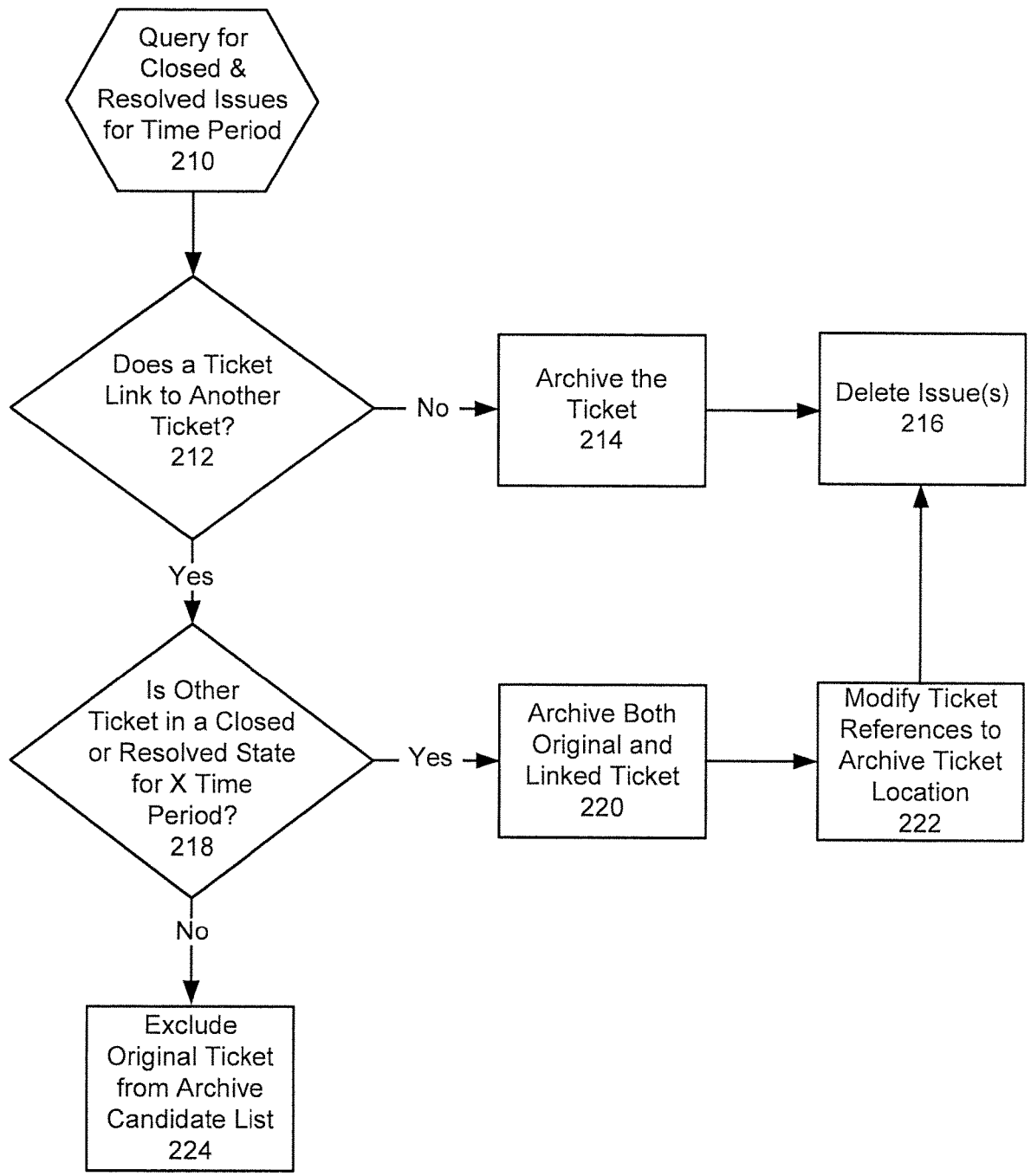
FIG. 2 is an exemplary flowchart of a method for archive candidate selection, according to an embodiment of the present invention.

FIG. 2 is an exemplary flowchart of a method for archive candidate selection, according to an embodiment of the present invention. At step 210, a query may be made to identify closed and resolved issues for a particular time period. Step 212 may determine whether a ticket links to another ticket. If no, the ticket may be archived at step 214. At step 216, the corresponding issue may be deleted. If a ticket is linked to another ticket, step 218 may determine whether the other ticket is in a closed or resolved state for a particular time period. If no, the original ticket may be excluded from an archive candidate list at step 224. If yes, both the original ticket and the linked ticket may be archived at step 220. Ticket references may be modified to identify an archive ticket location. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

According to an embodiment of the present invention, the system may query a specific Jira instance and retrieve valid archive candidates, as illustrated in FIG. 2. The data set may be used for various tasks, including an archive task, deletion task, etc. The system of an embodiment of the present invention may be configurable to archive based on various factors, including a specific ticket status (e.g., Closed, Fixed, Resolved, In-process, etc.), time periods (e.g., 18 months, 12 months, etc.) and/or other criteria.

For example, an embodiment of the present invention may archive tickets set to the specific status based upon a creation date, a specific status date (e.g., when they were set to a Resolved status) and/or other date or time period. The system of an embodiment of the present invention may be configurable to archive a specific Jira instance. For example, a system may perform a dry-run (as a preview) which may include a number of Jira issues set to be archived along with a total size of the attachments; however, the actual archive and ticket delete process will not occur. According to an exemplary scenario, the system of an embodiment of the present invention may maintain one HTML record per archived Jira ticket with a full history. In this example, output HTML files may have a Jira issue number embedded in the name of the document (e.g., CTMR-10009.html). Other naming conventions may be applied.

An exemplary interactive interface may receive a query, which may include a string, such as "EMPTY and Status=Closed AND Resolved <=2010-07-19." The interactive interface may provide a list of possible tickets (within the instance) that are possible candidates for archive. Matching issues may be displayed including information such as Key, Summary, Assignee, Reporter, Status, Resolution, Created date, Updated date, Date and Label.

At step 122, the system may perform an export of the queried issues. This may involve querying for a set of issues to archive. For example, a query may be executed against a database (or other source of data).

At step 124, the system may copy ticket numbers into a data file for processing. For example, the queried data may be ported into the system for processing/execution.

An Execution Layer 112 is directed to an exemplary HTML based archive of issues, e.g., Jira issues. As shown in FIG. 1, Execution Layer 112 may execute scripts to archive the issues.

At step 126, the system may execute a script creating the macro for the tickets and their attachments. For example, a macro may represent an instruction set that can run programmatically. The macro may represent an execution step or steps used for testing. At step 128, the Macro may archive the tickets as HTML files. For example, individual tickets may be saved in a particular format, such as a "Webpage Complete" format. The Webpage Complete format may include local references to common files (e.g., .css, .js, .png, etc.). Accordingly, a downloaded ticket may contain requirements to display an issue as if it still resided on a primary server.

For example, an interactive interface may provide a listing of local .html files and supporting directories. To capture a comprehensive set of issue data, a customized tab panel instruction may be added to a ticket URL string. Other functionality may be applied.

At step 130, the system may execute a script to index the archived issues by project, component, version, and/or other category, filter, etc. For example, a project may represent a collection of issues, and may be defined according to an organization's requirements and functionality. For example, a project may include a software development project; a marketing campaign; a helpdesk system; a leave request management system; a website enhancement request system, etc. A component may represent a logical or other grouping of issues within a project. For some projects (e.g., software development), an issue may be associated with a particular project version (e.g., 1.0, 1.1, 1.2, 2.0, etc.).

For example, once tickets are archived locally, an index may be generated. The index may be separated by a base project, for example. This index may then be exposed to an internal search for reference.

Figure 3:
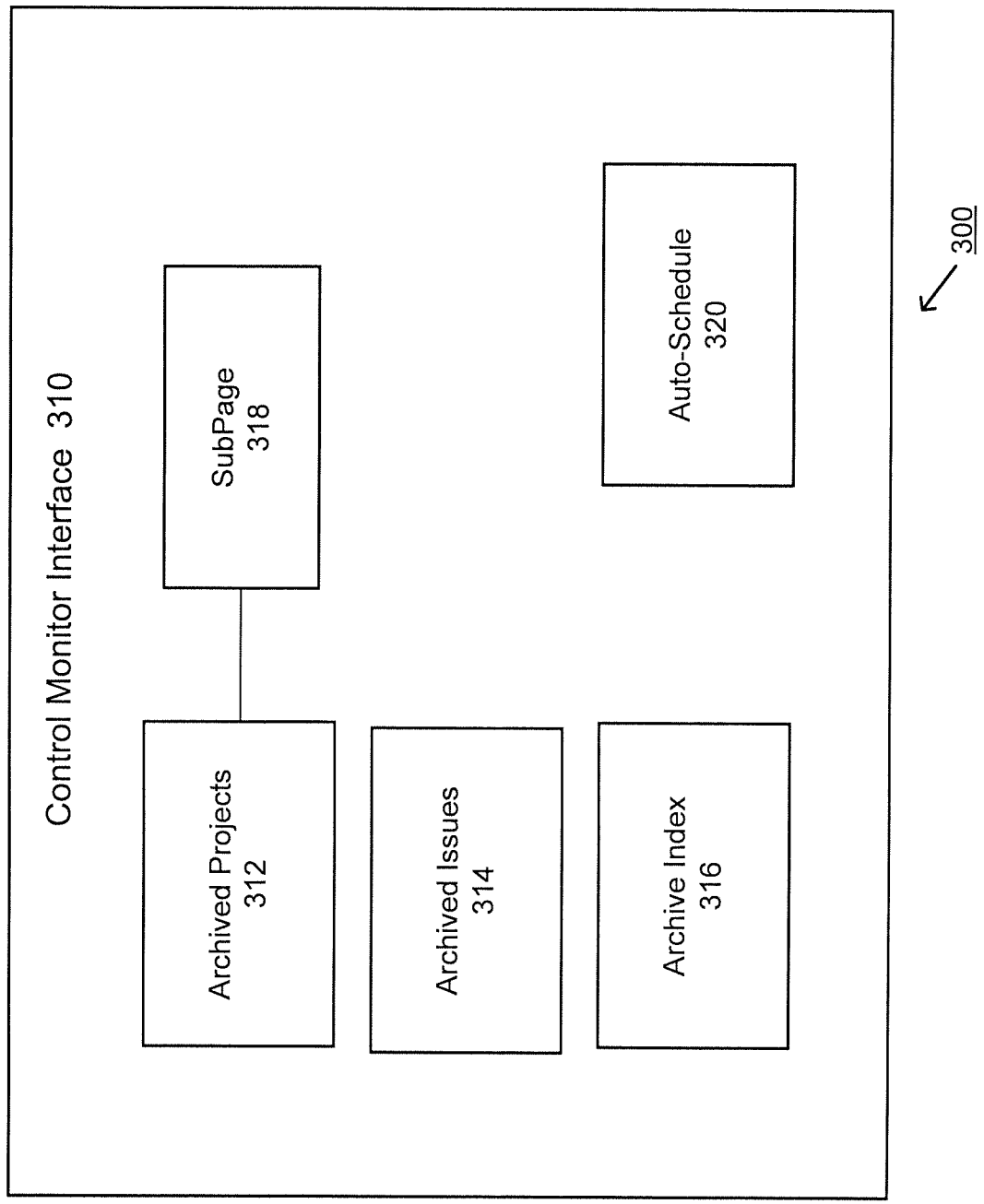
FIG. 3 illustrates an exemplary interactive interface, according to an embodiment of the present invention.

FIG. 3 illustrates an exemplary interactive interface, according to an embodiment of the present invention. An interactive interface, as represented by Control Monitor Interface 310, of an embodiment of the present invention may display a summary page that outputs a number of archived projects as represented by 312, a number of archived issues as represented by 314, and a generation date of the archive index as represented by 316. The summary page may list archived projects and provide a link to an appropriate sub-page, as represented by 318. The archived issue and associated attachments may be available in a compressed format for reference and/or for inclusion into another Jira issue as a supporting documentation and/or reference.

An embodiment of the present invention may be directed to creating a sub-page per project that indexes tickets and applies appropriate read permissions a per project basis. Each sub-page may have a link to the ticket, a closed date, a ticket title for searching and/or other information. Checkboxes may appear beside each ticket for a retrieval of a compression of the issues(s) and supporting attachments. The user may select single, multiple, or all issues (via the Select-All check-box) from a project for download. A compressed file may be created for the respective issue(s) and prompted to be saved on a user's machine.

An embodiment of the present invention may be directed to an interactive interface that provides active monitor data for each instance. Some entities may manage up to 20-30 instances that require 80-100 servers, for example. A control monitoring function of an embodiment of the present invention may analyze a number of projects and number of issues within all the particular instances. An auto schedule function, as represented by 420, may auto schedule archives for a specific set of conditions. For example, the system may set a specific time window, a specific instance order, a specific control and/or other criteria. Accordingly, when the system recognizes that there are 250,000 issues (or other threshold) that meet the criteria, the system may then automatically perform the archive. An embodiment of the present invention may implement a switch, such as a programmatic key, to automatically initiate archive and/or other archive related functionality (e.g., dry run, preprocessing, etc.). For example, an embodiment of the present invention may initiate a dry run to determine the volume and/or quality of potential candidate issues. Based on the dry run results, an embodiment of the present invention may perform a more detailed analysis of the issues, which may include items that are linked, particular attachments, etc. This enables the system to determine how to treat various groups within the issues for potential archive. For example, the system may identify 300,000 that meet the criteria. The system may identify that 25,000 are possible candidates and of that, 24,000 are scheduled to be archived, and the size of the corresponding attachments are 100K. The system may process and calculate a projected savings of the storage of the issues, as well as just the attachments alone, etc. The system may also identify how many backups, how many snapshots on a periodic schedule, as well as other storage calculations and determinations. For example, the interactive interface may provide a heat-map display that illustrates storage location, capacity and/or other consideration. Other tools, interfaces and displays maybe implemented in accordance with the various features and functions of the invention.

An embodiment of the present invention is directed to providing intelligent archiving analysis based on business rules, requirements, preferences, data sensitive, data criticality, and/or other data. The system may automatically and intelligently perform archiving processes based on customizable factors and these factors may be further refined based on business and other rules as well as historical archiving trends.

An embodiment of the present invention also considers compliance issues. For example, an entity may be required to perform internal and external audits. Accordingly, there is a need to retain records. An embodiment of the present invention enables an entity to manage and maintain records efficiently while staying compliant with various rules, regulations and policies, e.g., retention policies.

At step 132, the system may move support files to a common directory. As the tickets are archived, the supporting files may be downloaded to support a page's layout and associated functionality. As such, each issue may carry with it redundant files which may be moved to a common directory to better utilize existing storage capacity.

An embodiment of the present invention may be directed to identifying common files downloaded with each ticket (excluding attachments) and move these items to a common directory. As a result, this action removes a significant number of duplicate files such as supporting JavaScript, css files, etc.

At step 134, the Macro may archive the attachments. According to an embodiment of the present invention, attachments may represent files located on the Jira network-attached storage filer (NAS filer) which support the ticket documentation and may be downloaded in addition to the base information. A NAS filter may represent a file server with massive storage capacity. NAS filers may be designed for backup, archiving and sharing connectivity. Other types of storage file servers and storage filters may be implemented. The system may identify each attachment to an associated ticket and download a file to a local directory. According to an exemplary illustration, the application may use expression matching to identify each unique attachment and performs a "wget" command to download the item to the local storage.

At step 136, the system may perform a search and replace for HTML local references. With the move of the supporting files to a centralized directory and the subsequent download of each attachment to a local directory, the ticket .html file may be modified (in place) so that the links and attachments may be valid in a new format.

An embodiment of the present invention may identify local support paths and replace them with a valid path to the corresponding file in the centralized support directory. The system may identify attachment URLs and replace them with a valid path in the locally stored attachment directory. According to an exemplary illustration, the application may use expression matching to identify common locations and attachment URLs and then perform a "sed" command to perform a search and replace function on the existing files.

The ticket deletion process may be automated to remove any trace of the ticket from the underlying database and the respective attachments from the supporting NAS filer.

An embodiment of the present invention may run under a unique privileged account so archive deletions may be logged independently of other user and administrative actions. For example, the system may remove the Jira issues via the REST API including any attachments. The system may further verify the issue no longer exists and was removed without error using the Jira REST API.

An embodiment of the present invention may provide an output that lists the Jira tickets which are part of the Jira archive run (dry or actual). For example, the output may include Jira Instance, Project, Issue, Issue Summary, Resolved date, Archive date, Attachment (Y/N), Link to issue, Status, Details, etc.

At step 138, ticket index, archives and attachments may be moved to a web server. According to an embodiment of the present invention, archived tickets and their attachments may be moved to a centralized location so as to be available to the Jira users and to be part of scheduled backup policies.

An archive list may include various details, including a number of projects; a total number of issues archive may be listed and a latest archive run and/or other details. For example, an archive list may display an index HTML page where the archived Jira issues may be accessed. The Jira issues remain with their original number for historical reference and audit purposes. For example, an Archive List may display an issue identifier, closed or resolved date, as well as title and details.

The various embodiments of the present invention may realize various advantages. An embodiment of the present invention reduces and/or eliminates a need for a separate Jira archive instance for each production instance, thereby reducing administration tasks and platform costs. Each ticket is archived from a customized tab panel (e.g., an "All" or similar tab), providing the complete ticket history. Attachments are included in the archive ticket for reference. Moving common support files and updating their references significantly reduces storage consumption.

Figure 4:
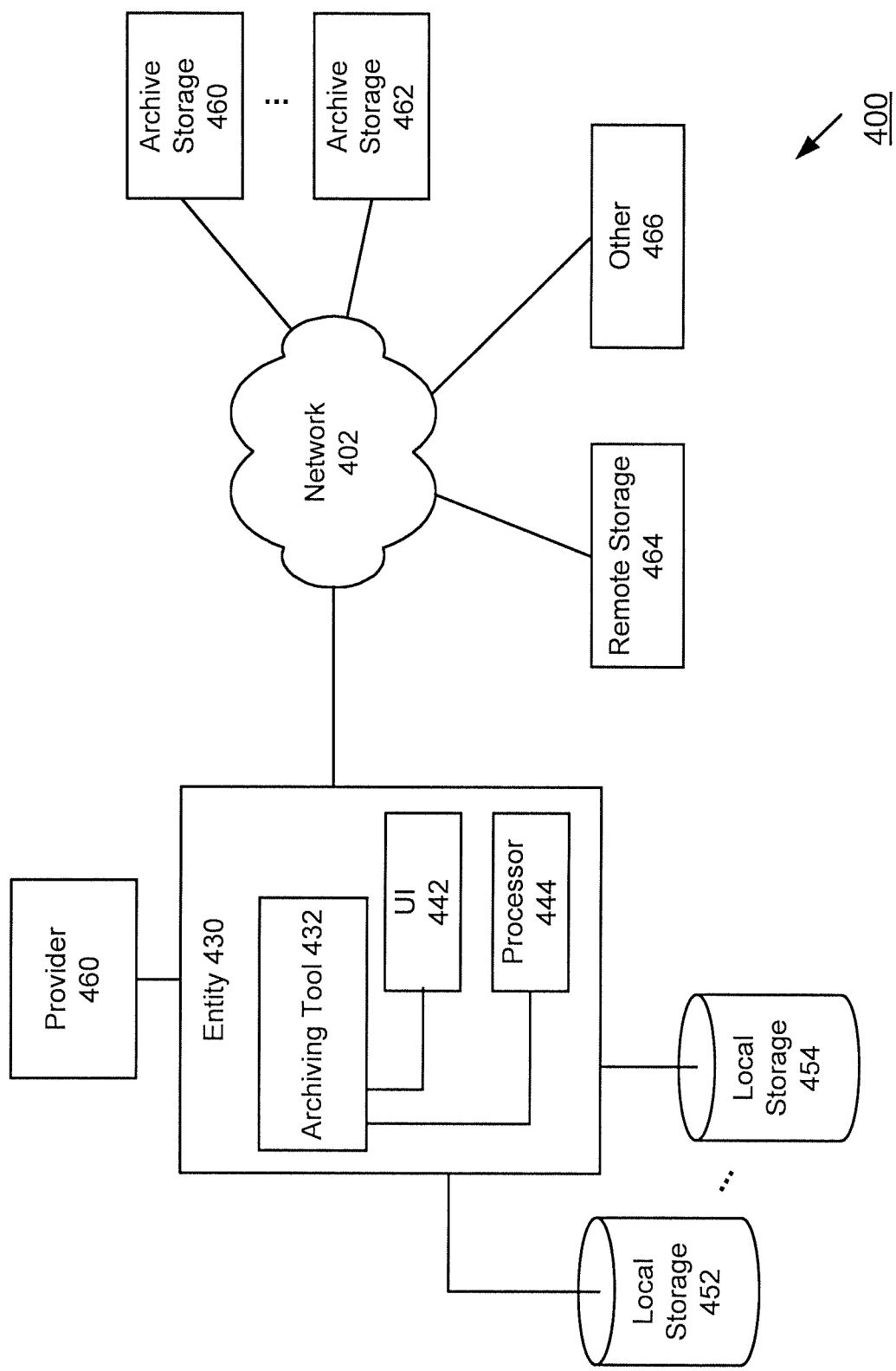
FIG. 4 illustrates a schematic diagram of a system that implements an Automated Archiving Tool, according to an exemplary embodiment.

FIG. 4 illustrates a schematic diagram of a system that implements an Automated Archiving Tool, according to an exemplary embodiment. As illustrated in FIG. 4, Network 402 may be communicatively coupled with one or more data devices including, for example, computing devices associated with end users. Such devices may include mobile devices, including mobile phones, smart devices, etc. Network 402 communicates with Entity 430 that performs system backups, archiving and other storage and maintenance functionality. Entity 430 may include an Archiving Tool 432 that automates and facilitates archiving in accordance with the various embodiments of the present invention. Archiving Tool 432 may also incorporate modules and other functions, such as User Interface 442 and Processor 444. These modules are exemplary and illustrative, Archiving Tool 432 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Archived data may be stored and managed by local storage represented by Local Databases 452, 454. Also, Local Databases 452, 454 may also store and maintain indexes, attachments, archived data, reports, performance data, code, etc. The archiving features described herein may be provided by Entity 430 and/or a third party provider, represented by 460, where Provider 460 may operate with Entity 430.

In accordance with the various features of an embodiment of the present invention, Archiving Tool 432 may store and manage data in other locations, such as Archive Storage 460, 462, Remote Storage 464 and other forms of storage represented by 466.

The system 400 of FIG. 4 may be implemented in a variety of ways. Architecture within system 400 may be implemented as hardware components (e.g., module) within one or more network elements. It should also be appreciated that architecture within system 400 may be implemented in computer executable software (e.g., on a tangible, non-transitory computer-readable medium) located within one or more network elements. Module functionality of architecture within system 400 may be located on a single device or distributed across a plurality of devices including one or more centralized servers and one or more mobile units or end user devices. The architecture depicted in system 400 is meant to be exemplary and non-limiting. For example, while connections and relationships between the elements of system 400 is depicted, it should be appreciated that other connections and relationships are possible. The system 400 described below may be used to implement the various methods herein, by way of example. Various elements of the system 400 may be referenced in explaining the exemplary methods described herein.

Network 402 may be a wireless network, a wired network or any combination of wireless network and wired network. For example, Network 402 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 402 may support an Internet network, a wireless communication network, a cellular network, Bluetooth, or the like, or any combination thereof. Network 402 may further include one, or any number of the exemplary types of networks mentioned above operating as a stand-alone network or in cooperation with each other. Network 402 may utilize one or more protocols of one or more network elements to which it is communicatively coupled. Network 402 may translate to or from other protocols to one or more protocols of network devices. Although Network 402 is depicted as one network for simplicity, it should be appreciated that according to one or more embodiments, Network 402 may comprise a plurality of interconnected networks, such as, for example, a service provider network, the Internet, a cellular network, corporate networks, or even home networks, or any of the types of networks mentioned above.

Data may be transmitted and received via Network 402 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5

Ethernet connection, a fiber connection, a cable connection or other wired network connection.

While FIG. 4 illustrates individual devices or components, it should be appreciated that there may be several of such devices to carry out the various exemplary embodiments. Entity 330 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Entity 430.

Entity 430 may be communicatively coupled to Local Database 452, 454 as well as Remote Storage represented by 460, 462, 464 and 466. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 402, or communications may involve a direct connection between the various storage components and Entity 430, as depicted in FIG. 4. The storage components may also represent cloud or other network based storage.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system that implements an automated archiving tool, the system comprises:
    a memory component;
    an interactive interface that receives one or more user inputs; and
    a processor, coupled to the memory component and the interactive interface, the processor configured to perform the steps comprising:
        querying for issues that meet an archive criteria wherein the archive criteria comprises one or more of an issue age, a date earlier than a predetermined date, issues falling within a date range, and issues relating to a specific project or category;
        performing an export of the queried issues that meet the archive criteria;
        copying one or more ticket numbers corresponding to each exported issue into a data file;
    for each ticket identified by the ticket numbers:
        determining if a ticket relating to an exported issue links to one or more additional tickets, and further determining if any of the one or more additional tickets do not meet the archive criteria;
        excluding the ticket upon determining that any of the one or more additional tickets do not meet the archive criteria;
        executing a first script creating a macro comprising an instruction set for archiving non-excluded tickets and associated attachments;
        archiving the non-excluded tickets as HTML flat files via the macro;
        executing a second script to index the archived tickets by project;
        moving support files to a common directory;
        archiving the attachments via the macro; and
        identifying local references.

2. The system of claim 1, wherein the archive criteria comprises closed and resolved issues having a date earlier than a predetermined target date.

3. The system of claim 1, wherein the interactive interface outputs archived project data, archived issue data and archive index data.

4. The system of claim 1, wherein the interactive interface provides a link to a subpage for each archived project.

5. The system of claim 4, wherein the subpage comprises an index, a link to tickets, closed data and ticket title.

6. The system of claim 1, wherein the processor is further configured to perform:
    replacing HTML local references for the attachments.

7. The system of claim 1, wherein the processor is further configured to perform:
    transferring ticket index, archives and attachments to a remote web server.

8. The system of claim 7, wherein the processor is further configured to perform:
    deleting the queried issues from a local storage.

9. The system of claim 1, wherein the processor is further configured to perform:
    determining whether a ticket links to another ticket.

10. The system of claim 9, wherein the processor is further configured to perform:
    determining whether the another ticket has a corresponding closed or resolved status.

11. An automated computer implemented method that implements an automated archiving tool comprises the steps of:
    querying for issues that meet an archive criteria wherein the archive criteria comprises one or more of an issue age, a date earlier than a predetermined date, issues falling within a date range, and issues relating to a specific project or category;
    performing an export of the queried issues that meet the archive criteria;

copying one or more ticket numbers corresponding to each exported issue into a data file;

for each ticket identified by the ticket numbers:

determining if a ticket relating to an exported issue links to one or more additional tickets, and further determining if any of the one or more additional tickets do not meet the archive criteria;

excluding the ticket upon determining that any of the one or more additional tickets do not meet the archive criteria;

executing a first script creating a macro comprising an instruction set for archiving non-excluded tickets and associated attachments;

executing a second script to index the archived tickets by project;

moving support files to a common directory;

archiving the attachments via the macro; and identifying local references.

12. The method of claim 11, wherein the archive criteria comprises closed and resolved issues having a date earlier than a predetermined target date.

13. The method of claim 11, wherein the interactive interface outputs archived project data, archived issue data and archive index data.

14. The method of claim 11, wherein the interactive interface provides a link to a subpage for each archived project.

15. The method of claim 14, wherein the subpage comprises an index, a link to tickets, closed data and ticket title.

16. The method of claim 11, further comprising the step of:

replacing HTML local references for the attachments.

17. The method of claim 11, further comprising the step of:

transferring ticket index, archives and attachments to a remote web server.

18. The method of claim 17, further comprising the step of:

deleting the queried issues from a local storage.

19. The method of claim 11, further comprising the step of:

determining whether a ticket links to another ticket.

20. The method of claim 19, further comprising the step of:

determining whether the another ticket has a corresponding closed or resolved status.

* * * * *